(12) United States Patent
Seshadri et al.

(10) Patent No.: US 8,352,299 B1
(45) Date of Patent: Jan. 8, 2013

(54) ASSESSMENT OF ITEM LISTING QUALITY BY IMPACT PREDICTION

(75) Inventors: Mukund Seshadri, San Francisco, CA (US); Deepak Jain, Los Altos, CA (US); Tevye Rachelson Krynski, Oakland, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 13/114,840

(22) Filed: May 24, 2011

(51) Int. Cl.
*G06Q 40/00* (2012.01)
(52) U.S. Cl. .................................. 705/7.11; 705/7.42
(58) Field of Classification Search ......... 705/7.11–7.42
See application file for complete search history.

(56) References Cited

U.S. PATENT DOCUMENTS

| | | | | |
|---|---|---|---|---|
| 5,956,693 A | * | 9/1999 | Geerlings | 705/14.53 |
| 7,555,444 B1 | * | 6/2009 | Wilson et al. | 705/14.41 |
| 7,885,849 B2 | * | 2/2011 | Gross | 1/1 |
| 2001/0014868 A1 | * | 8/2001 | Herz et al. | 705/14 |
| 2001/0047293 A1 | * | 11/2001 | Waller et al. | 705/10 |
| 2006/0010030 A1 | * | 1/2006 | Sorensen | 705/10 |
| 2007/0156515 A1 | * | 7/2007 | Hasselback et al. | 705/14 |
| 2009/0192870 A1 | * | 7/2009 | White et al. | 705/10 |
| 2011/0131202 A1 | * | 6/2011 | Cohen et al. | 707/723 |

* cited by examiner

*Primary Examiner* — Thomas Dixon
*Assistant Examiner* — Benjamin S Fields
(74) *Attorney, Agent, or Firm* — Novak Druce + Quigg LLP

(57) ABSTRACT

Systems and methods use behavioral data to assess listings for items. The behavior data may relate to information regarding user actions in connection with listings for the items. The listings may be collections of information about the items. Behavioral data in connection with a collection of listings is used to assess how changing listings affects one or more performance measures and/or to score listing quality. The assessment may be used for various purposes, such as identifying listings that may be changed to achieve one or more improved performance measures for corresponding items and for other applications.

30 Claims, 8 Drawing Sheets

ASSESSMENT OF ITEM LISTING QUALITY BY IMPACT PREDICTION

BACKGROUND

Many items are offered for consumption in electronic marketplaces, which may be accessible to customers in various ways. Access to the electronic marketplace may be provided to customers through websites, applications on customer devices, and in other ways. However the electronic marketplace is accessed, customers generally navigate through content of the electronic marketplace and utilize the electronic marketplace to consume items offered. Customers may, for example, purchase goods that will then be shipped to the user. As another example, customers may utilize the electronic marketplace to view, download, or otherwise consume electronic content such as audio, video, text, applications, and/or combinations thereof.

In many instances, customers of an electronic marketplace view or otherwise experience content related to items of interest. A customer may, for instance, view a webpage that includes information about an item offered for consumption. The information may describe, demonstrate, or otherwise present the item to the customer. The information may, for example, include specifications about the item, one or more pictures of the item, options available for the item, a video demonstrating how the item functions, reviews of the item by other customers that are familiar with the item, and/or other information. Moreover, the amount of information provided about items offered for consumption and the manner in which the information is presented may significantly affect customer decisions regarding whether to purchase or otherwise consume the items. Too little information presented about an item may leave a consumer unsure about purchasing decisions because the consumer feels inadequately informed about the item, because a lack of interest may cause a lack of confidence in the organization offering the item, or for other reasons. At the same time, too much information may be overwhelming. Accordingly, effectively presenting information about items offered for consumption may be significant for successful operation of an electronic marketplace.

DETAILED DESCRIPTION

Figure 1:
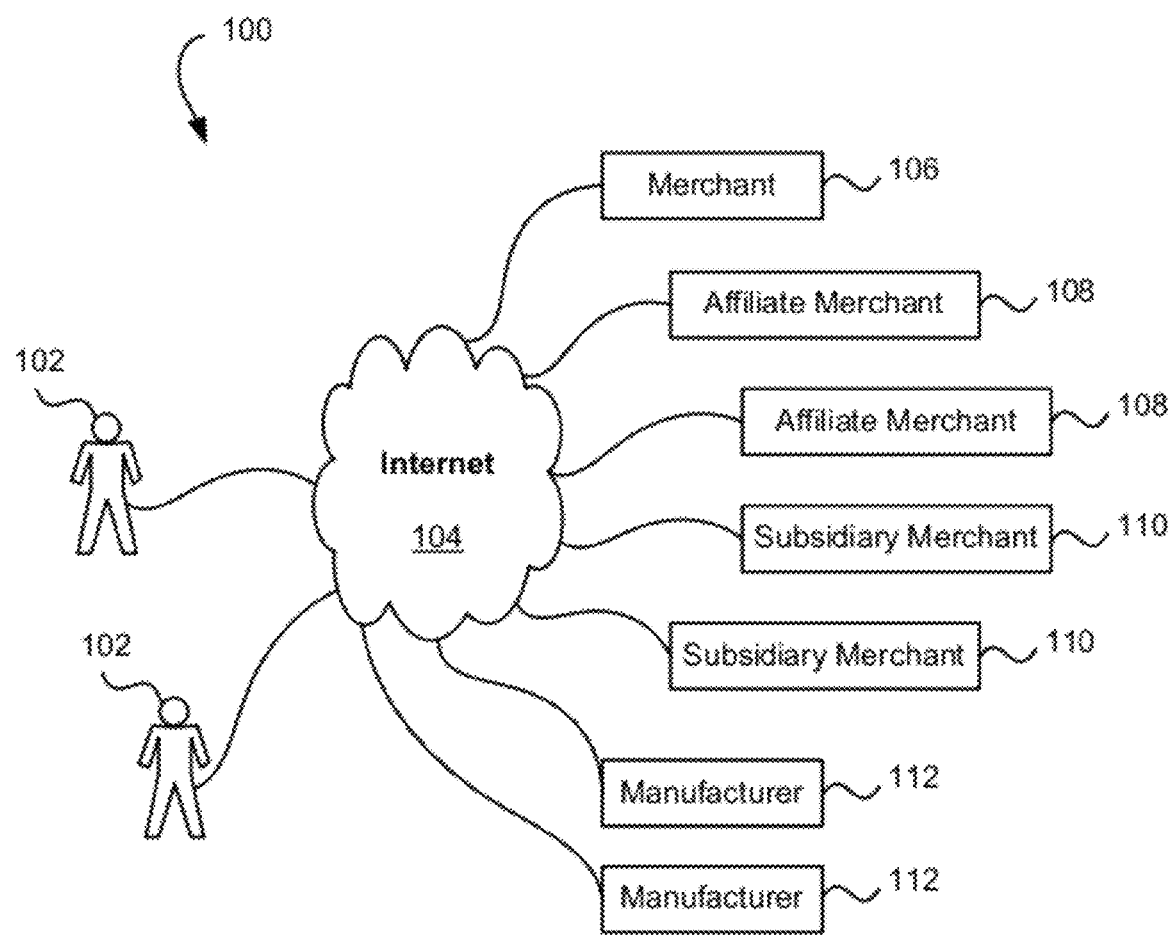
FIG. 1 illustrates an environment in which various embodiments can be implemented.

Systems and methods described and suggested herein utilize techniques for assessing listing attributes based at least in part on behavior data. A listing may be a collection of information relating to an item. The item may be an item offered for consumption in an electronic marketplace or in another environment. The collection of information for a listing may include one or more informational components such as a title, a narrative description, an image, a video, an audio file, a set of specifications, and, generally, any information relevant to a corresponding item. Presentations of the listings may be provided to users to facilitate user decisions whether to consume corresponding items. As one example, a presentation of a listing may take the form of a web page of a website of an electronic marketplace. The web page may include a display of some or all of the informational components of a listing for an item offered for consumption in the electronic marketplace. A user that has accessed the webpage may consider the provided information in determining whether to purchase or otherwise consume the item.

As users view or otherwise experience presentations of listings, behavioral information may be recorded regarding activities performed by the users and may be stored in one or more data stores. In an embodiment, information is gathered and stored regarding listings for which presentations have been accessed by users. The information may indicate how many times presentations for certain listings have been accessed, frequencies at which users that have viewed presentations for listings have purchased or otherwise consumed corresponding items, frequencies at which users that have viewed presentations for listings have performed other actions (such as placing items in an electronic shopping cart), and the like. The information may also include information regarding how users navigated to presentations of listings. For example, the information may associate search queries and/or keywords with listings based at least in part on search queries submitted by users in order to access the listing presentations. A click-though rate for each listing may indicate a frequency at which users to whom a link to a listing presentation was provided in search results actually selected the link. Other information, which may include economic information regarding revenue, margin, profit, and/or other financial metrics may be associated with the listings and included with the behavioral information. Generally, any information regarding user actions (which may include instances of inaction) in connection with listings may be gathered and stored.

In an embodiment, attributes for listings are obtained. The obtained attributes for the listings may be referred to as listing information. Data stored in connection with listings may be analyzed to determine the attributes. The state of an attribute for a listing may indicate or otherwise be based at least in part on the state of a corresponding informational component for the listing. As one example, the state of a "title" attribute for a listing may be a Boolean or other value that indicates whether the listing includes a title. Another attribute for a listing may be a Boolean or other value that indicates whether the title of the listing contains any typographical errors. Attributes may also reflect numerical values for a listing, such as a number of user-generated reviews a corresponding item has received. Generally, an attribute for a listing may indicate any aspect of one or more informational components of the listing. For an attribute of a listing, one or more states of the attribute may be considered to be defective states. An attribute for a listing that indicates that the listing is missing a title, for example, may be considered to be in a defective state.

In an embodiment, the behavioral information and listing information are obtained and analyzed to identify one or more attributes for which a change from a defective state to a non-defective state is expected to change a performance measure. The performance measure, may be a measure of an aspect of consumption. The performance measure may be, for example, a purchase rate of an item offered for consumption. In this example, the analysis may identify an attribute that, for listings having the attribute in a defective state, changing the listings so that the attribute is no longer in a defective state is expected to increase purchase rates for corresponding items. For instance, a title attribute may be identified if the analysis indicates that purchase rates for items may be increased by including titles in corresponding listings that do not currently have titles.

Analysis of the obtained behavioral information and listing information may be performed in various ways. In one embodiment, the information is analyzed using logistic regression techniques to generate a logistic regression model. The model may be a function that receives attribute states as inputs and provides a value that estimates a performance measure or at least represents a function of the performance measure such that the value indicates an estimate of the performance measure. In this manner, the model may be sued to determine an effect on a performance measure of changing one or more attribute states. For example, inputs may be varied and input into the model to determine the effect. The effect may also be apparent by the model itself. For instance, the magnitude of a regression coefficient associated with an attribute state may indicate the effect of changing the attribute state. While embodiments of the present disclosure are directed to logistic regression models, other regression models, other models, and, generally, other methods of analyzing data may be used in accordance with various other embodiments. For instance, Baysian networks may be used to analyze the obtained behavioral information and listing information to identify attributes for which a change of state is expected to affect a performance measure.

Models generated in accordance with the various embodiments may be used in various ways to improve listings. For example, a generated model may be used to evaluate listings to calculate a measure their defectiveness. A listing may be evaluated based at least in part on the attributes of the listing in a defective state. Attributes in a defective state may be weighted according to a generated model's estimate of how much changing each attribute to a non-defective state changes a performance measure. A set of defective attributes for a listing may be used in determining calculating a defectiveness measure. For example, a listing with just a defective title may be considered less defective than another listing that has both a defective title and another attribute in a defective state. Listings may be ordered based at least in part on measurements of their defectiveness. Information identifying the listings may be provided to a one or more users having the capability of changing the listings. An attribute in a defective state may be corrected, for example, by changing the listing in a manner that results in the attribute being in a non-defective state. Information that was missing from a listing, for example, may be included in the listing.

FIG. 1 shows an example environment 100 in which various embodiments may be practiced. The environment 100 may be realized utilizing one or more of the components of the environment described above in connection with FIG. 1. The environment 100, in an embodiment, includes a plurality of users 102 that utilize a network such as the Internet 104 to browse content of various content providers. While the environment 100 shows the users 102 utilizing the Internet, it should be understood that other networks may be used as an alternative to or in addition to the Internet 104. Examples of other networks include mobile networks, intranets, and generally any suitable communications network.

Figure 2:
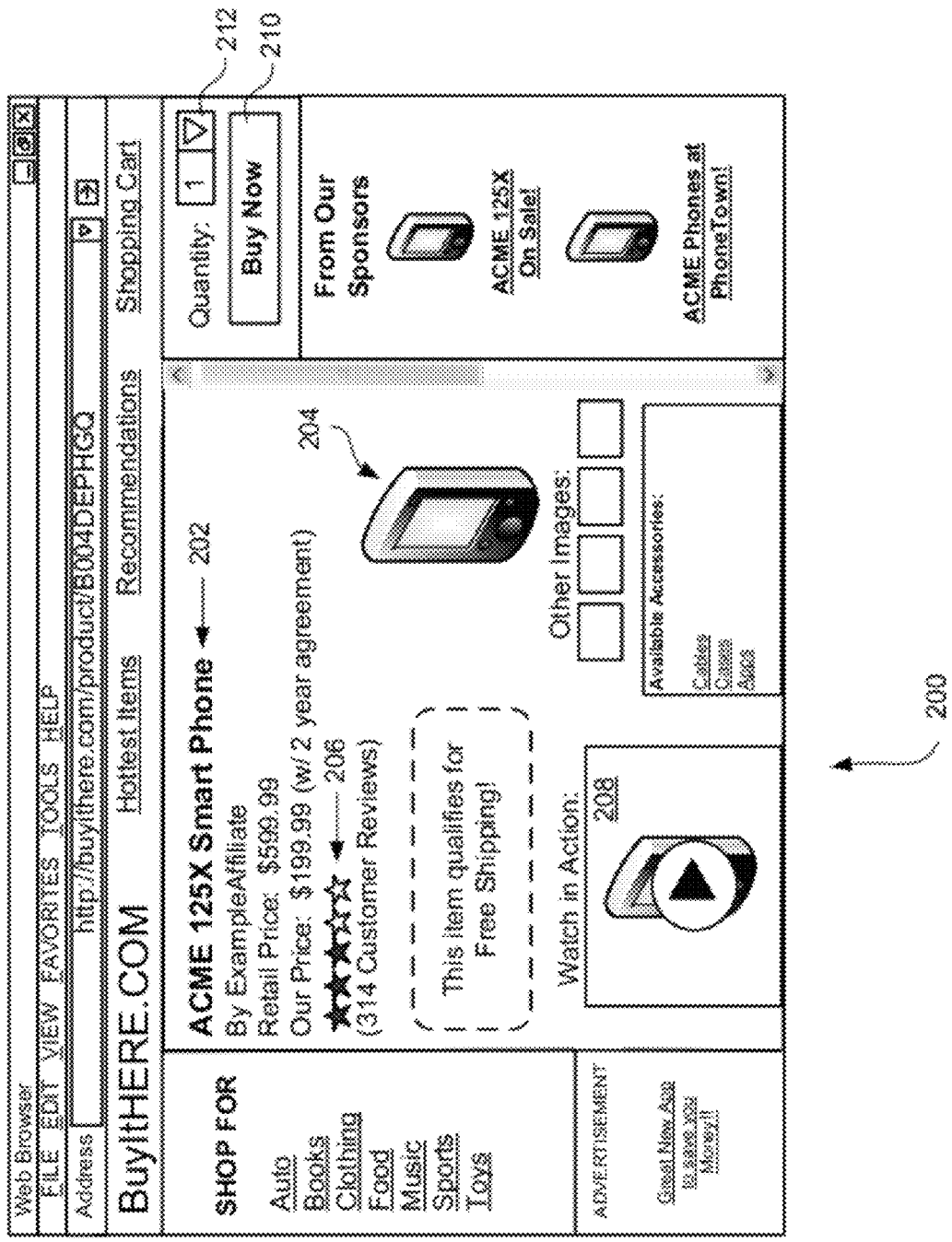
FIG. 2 illustrates a webpage showing an item listing in accordance with at least one embodiment.

In an embodiment, users 102 may interact with other entities in order to consume content, search for information, purchase items for consumption, and the like. As used herein, an item for consumption includes any item which may be consumed by a consumer. Examples include tangible items, such as consumer products. Examples also include electronic items which may be downloaded and/or streamed, including audio files, video files, application files, and other digital content. Examples of items for consumption also include services which may be performed for and/or on behalf of consumers. As shown in FIG. 2, the environment 100 includes a merchant 106. The primary merchant 106, for example, may operate an electronic marketplace such that the users 102 may submit orders for items for consumption offered by the primary merchant 106. The primary merchant 106 may offer consumer products that it sells itself and may itself fulfill orders for the items, such as from its own distribution warehouse. The merchant may also offer for consumption items while another entity may fulfill orders for the items for consumption. The merchant may also operate systems, such as those described above in connection with FIG. 1, that enable others to utilize the systems to offer items for consumption.

For example, in an embodiment, the environment 102 includes one or more affiliate merchants 108. In an embodiment, an affiliate merchant is a merchant who offers for consumption items that are actually consumed by consumers from the primary merchant 106. For example, a consumer may place an order with an affiliate merchant 108 and the primary merchant 106 may fulfill the order by providing or causing to be provided any items for consumption ordered. Affiliate merchants may operate in various ways. For instance, an affiliate merchant may operate its own website, but advertise items for consumption that are offered by the primary merchant 106. Affiliate merchants may also offer their own items for consumption, but may utilize various systems provided by the primary merchant 106, such as electronic checkout systems that enable users to pay for items for consumption, and other systems. In some instances, the affiliate merchant may offer items for consumption using an electronic marketplace operated by the merchant 106. In such instances, customers may, for example, visit a website of the merchant 106 and use electronic ordering and payment processes of the merchant 106 to purchase items offered by an affiliate merchant 108. The affiliate merchant may then fulfill orders made through the systems of the merchant 106.

Also shown in the drawing, the environment 100 may include one or more subsidiary merchants 110. In an embodiment, a subsidiary merchant is a merchant whose operations are controlled, either completely or partially, by the primary merchant 106. For example, a subsidiary merchant 110 may be operated by the primary merchant 106, but may offer items for consumption under a brand different from the primary merchant 106. The subsidiary merchant 110 may offer the same products or products for consumption different from the primary merchant 106.

Manufacturers 112 and other entities may provide information to the merchant 106 about items offered for consumption. A manufacturer of an electronic device offered for sale through an electronic marketplace of the merchant 106 may, for example, provide specifications, pictures, video, and other information about the device. The merchant 106 may present some or all of that information to customers to assist the customers in making purchasing decisions regarding the electronic device. Other entities, such as wholesalers and, generally, any entity, may provide such information for use by the merchant in an electronic marketplace. In some instances, customers themselves may provide information to the merchant 106, such as their own photographs and/or video relating to items offered for consumption, reviews of items offered for consumption, and the like.

Information about items offered for consumption in an electronic marketplace may be organized into listings corresponding to the items. A listing associated with an item may be a collection of information related to the item. Information from a listing may be presented to users in various ways, such as through a web site interface. FIG. 2, accordingly, shows an illustrative example of a presentation of a listing for an item in accordance with an embodiment. In this particular illustrative example, the item is a mobile phone. In this example, the presentation is in the form of a web page of an electronic marketplace, although presentations may take other forms. A presentation of a listing, for example, may be a search result that links to information about a corresponding item. A listing may have associated with it multiple presentations, such as search results and web pages having features such as those illustrated in FIG. 2. As shown in FIG. 2, the information of a listing may be of various types, such as text, audio, video, and the like. For example, as shown in FIG. 2, the webpage 200 includes a title 202, an image of the item 204, a rating of the item 206, a video about the item 208, and other information corresponding to the item listed. Also as shown in FIG. 2, the webpage 200 includes other contents such as advertisements. In addition, the webpage 200 includes other features such as a button 210 that allows users to place the items featured in the webpage 200 in an electronic shopping cart, or to purchase, or to immediately purchase the item. Similarly, the webpage 200, in this example, includes a quantity selector 212 which allows users to select how many of the featured items the user wishes to purchase. A user having visited the webpage 200 may perform other activities, such as searching for other items and activities involved in the completion of a transaction in connection with the item. For example, a user may navigate to an interface that allows the user to provide billing information for the item, select shipping preferences for the item and the like.

Figure 3:
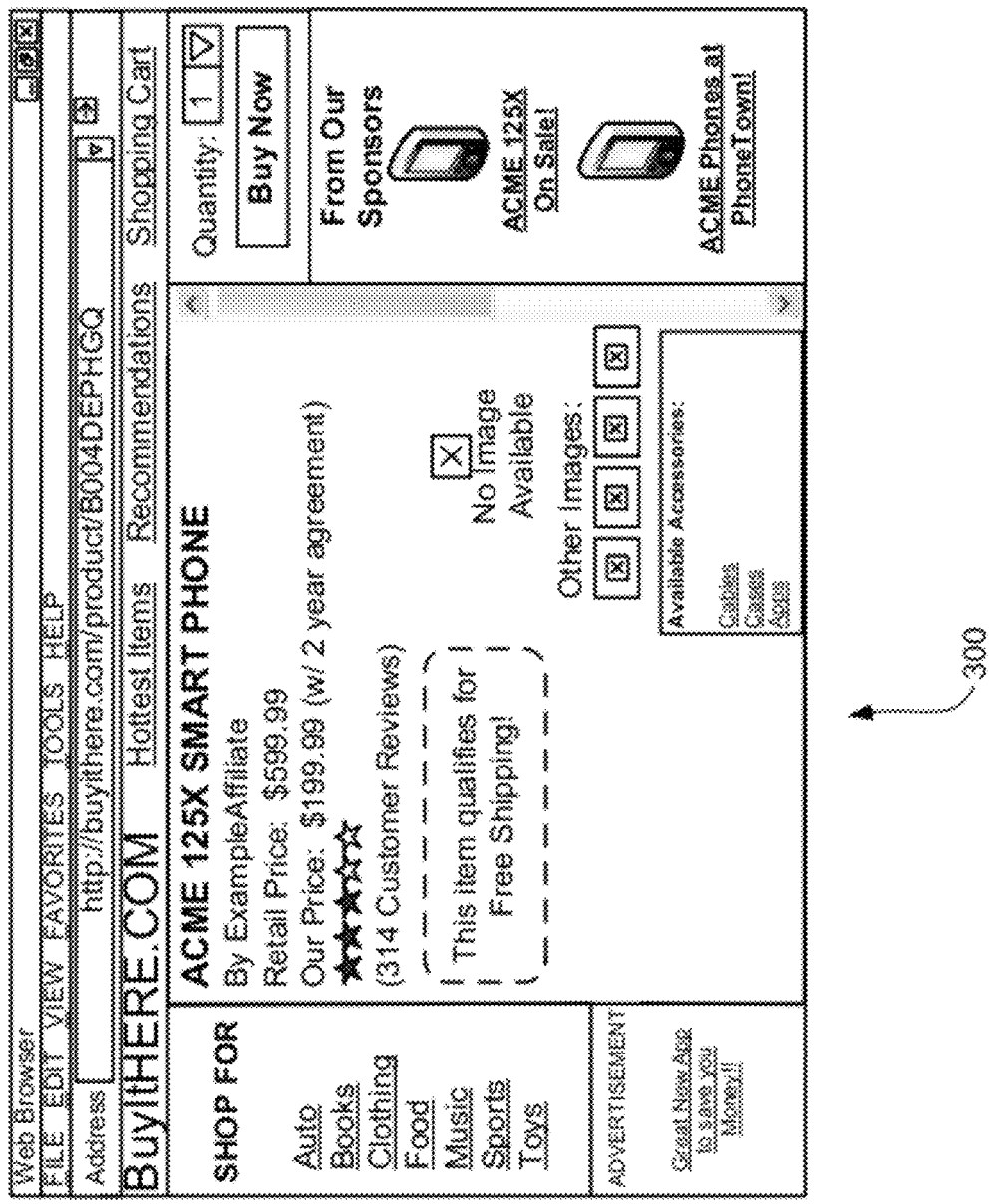
FIG. 3 shows a webpage similar to the webpage shown in FIG. 2 showing a similar listing although having certain defects.

FIG. 3 shows an illustrative example of a webpage 300 which is, in this example, similar to the webpage 200 described above in connection with FIG. 2. In FIG. 3, however, the listing for which information is displayed in the webpage 300 includes several defects. Therefore, in this example, the presentation of the listing differs from the presentation shown in FIG. 2 due to the defects in the listing. A defect may correspond to a component of the listing having a particular state. For instance, as shown in FIG. 3, the listing for the item does not include an image and therefore it may be said that the listing has a defect because an image for the listing is absent. Similarly, as shown in FIG. 3, a video for the listing is also absent. It should be noted that the defects shown in FIG. 3 are provided for the purpose of illustration and the defects can appear in various forms. For example, the misspelling of one or more components of a listing, such as a title, may imply a defect. Similarly, a defect for a listing may be that the listing lacks a sufficient number of customer reviews, or the listing is for an item for which free shipping or other incentives are not provided. Generally a defect may correspond to any component of the listing having one or more particular states.

Figure 4:
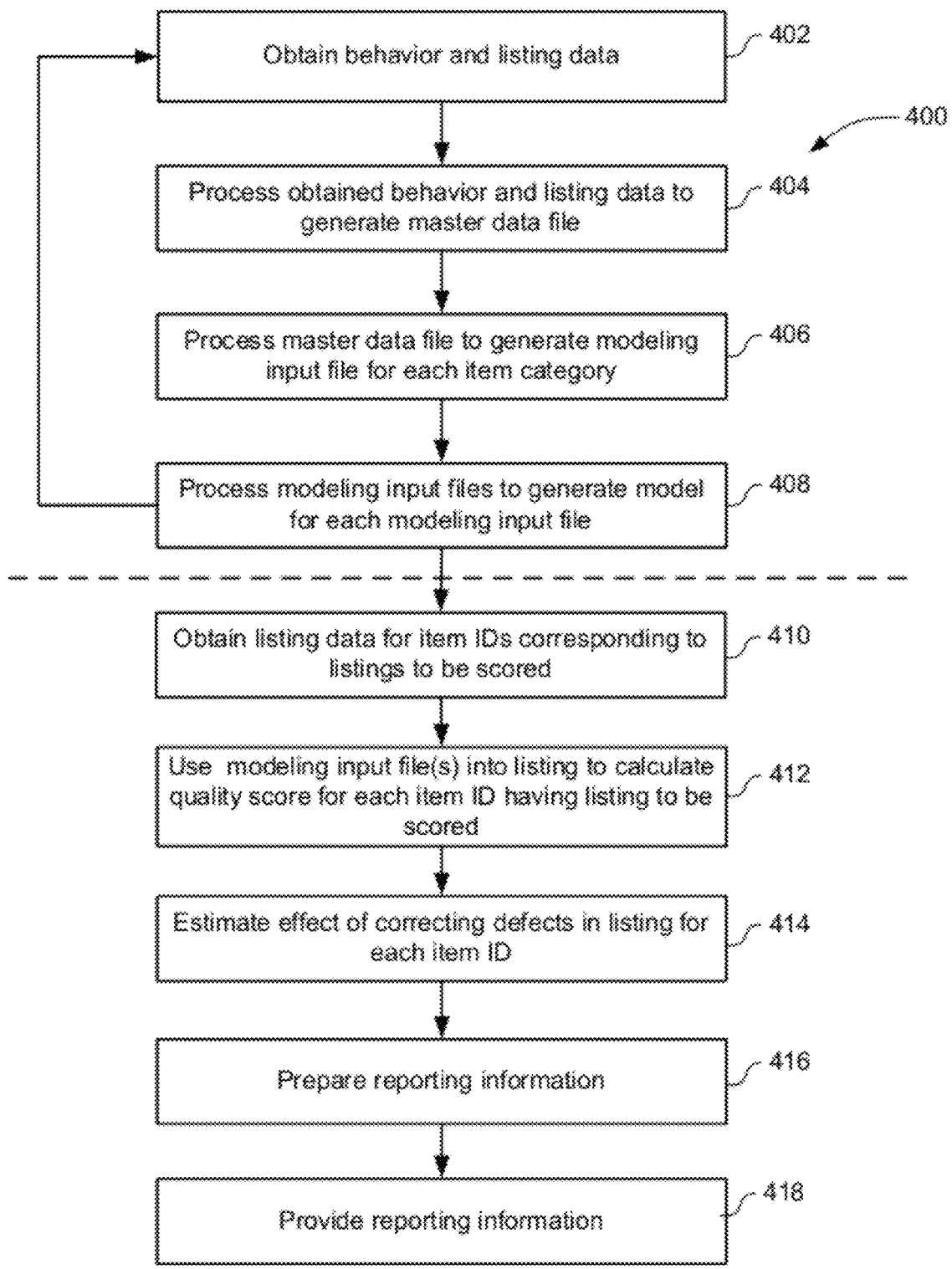
FIG. 4 shows example steps of a process for providing information regarding the listing defects in accordance with at least one embodiment.

As discussed above, various embodiments of the present disclosure are directed to the identification and are directed to analyzing information in order to determine the effect of the defects in item listing. Accordingly, FIG. 4 shows an illustrative example of a process 400 which may be used to provide information about item defects. Some or all of the process 400 (or any other processes described herein or variations and/or combinations thereof) may be performed under the control of one or more computer systems configured as executable instructions and may be implemented as code (e.g., executable instructions, one or more computer programs, one or more applications) executed and collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In an embodiment, the process 400 includes obtaining behavior and listing data for a plurality of items. Behavior data may be data that indicates actions taken by users of an electronic marketplace. The behavior may include statistics regarding search queries submitted by users, listing presentations visited by users, items purchased by users, items placed by users into an electronic shopping cart, items placed on an electronic shopping list or wish list by users, and the like. The various statistics may be recorded and maintained in a manner that shows relationships among the statistics. Behavior data, for instance, may indicate that a certain percentage of users that performs a particular action then proceeds to perform another action. Behavior data may indicate, for example, that a certain percentage of users who submit a particular search query (or keyword as part of a search query) proceeds to purchase a particular item. As another example, behavior data may indicate that a certain percentage of users who view a presentation of a listing proceeds to purchase an item corresponding to the listing. As yet another example, behavior data may indicate that a certain percentage of users who view a presentation of a listing proceeds to purchase another item that does not correspond to the listing.

In an embodiment, the behavior data includes, for each of a plurality of items, a click rate, a debiased click rate, an add rate, a purchase rate. A click rate for an item may represent a number of times an impression corresponding to an item was clicked to navigate to the representation of the listing divided by a number of times the search listing (or other part of an interface) was presented for selection. An impression corresponding to an item may be a search listing and/or other portion of an interface that allows navigation to a representation of a listing for the item. The debiased click rate may represent a number of impressions divided by a number of times users were detected as having virtually examined the impression (such as by hovering a mouse over the impression or otherwise indicating interest in the impression). The add rate for an item may be a rate at which users that have clicked an impression proceeded to add the item to an electronic shopping cart. The purchase rate for an item may be the rate at which users that have clicked an impression proceeded to purchase the item. Generally, the behavior may indicate any type of behavior of interest. Further, the behavior data may be stored in a manner that allows for direct lookup of certain statistics and/or in a manner that allows for calculation of statistics of interest. Also, the behavior data may include various numerical information, such as the number of users who submitted certain queries (or keywords as part of queries), the number of users who consumed certain items, the number of users who performed one action and did or did not perform another action, and the like.

The listing data, in an embodiment, includes information about the listings. The listing data may be, for example, encoded in one or more documents that indicate what information is in each listing. The behavior and listing data may be generated and obtained in various ways in accordance with various embodiments. For example, data may be stored into various data stores involved with operations of an electronic marketplace. An organization operating an electronic marketplace may utilize, for example, various databases, data warehouses, and file systems, such as a distributed file system utilizing an Apache Hadoop framework. The behavior may be taken from the various data stores directly using appropriate processes. Some or all of the behavior data may be first obtained from one or more data stores and processed into a more suitable form.

In an embodiment, when the behavior and listing data have been obtained, the obtained behavior and listing data are processed 404 to generate a master data file. In an embodiment, each of a plurality of items offered for consumption (and corresponding to at least one listing) corresponds to at least one item identifier. This may be a unique identifier for the item used by the electronic marketplace and possibly by others. In an embodiment, the generated data file is a master flat file that includes one row per item identifier. The columns of the flat file may represent attributes of the item for at least one listing associated with the item. The data file may be generated, for example, by performing join, filter or other transformations from one or more data sources from which the behavior and listing data are obtained. In one embodiment, when an Apache Hadoop framework is utilized to operate a distributed file system, Pig scripts on a Hadoop cluster may be used to bring data from the distributed file system to the master file. Some entries in the master data file may be Boolean values representing whether corresponding information in a corresponding listing is included in the listing. The Boolean values may be "True" or "False," or numerical equivalents, such as 0 or 1. Other entries in the master data may include numerical information representative of a characteristic of corresponding information in a corresponding entry. A number in an entry may represent, for example, how many images are included with a listing, how many user reviews the corresponding item has received, an average user rating given to the item, a price for the item, and other values.

In an embodiment, the processed master data file is processed 406 to generate a modeling input file for each of the plurality of item categories. The item categories may correspond to categories into which the items have been classified. Possible item categories include electronics, canned goods, kitchen goods, food, music, and the like. The categories may be broad, such as electronics or may be narrow, such as light emitting diodes (LED) television. The breadth of the categories may be chosen according to the amount of data that would be processed for the categories. One example of processing a master data file to generate a modeling input file is discussed below in connection with FIG. 5.

In an embodiment, once the modeling input files have been generated, the modeling input files may be processed 408 to generate results for each modeling input file. Processing the modeling input files may be performed, for example, by performing a logistic regression for a model as described in more detail below. Any method of processing the data including the use of Baysian networks may be used. In an embodiment, a result of processing a modeling input file is a mathematical model of a commercial value as a function of at least defects in a listing. The results may include multiple models, each modeling a different value. The commercial value may be, for example a conversion rate that represents a percentage of users who view a representation of a listing that proceeds to consume an item corresponding to the listing. Another example of a commercial value is a click rate that represents a percentage of users who view a representation of a listing that performs some action, such as clicking an interface button that places the item in an electronic shopping cart. As yet another example, the commercial value may be a click rate that represents a percentage of users that, having been presented a link to a presentation of a listing in search results, selects the link to navigate to the presentation of the listing. Generally, the results may model any suitable statistic relevant to an electronic marketplace.

As illustrated by the dotted line in FIG. 4, actions described above may be performed periodically in order to recalculate and/or update models as behavior and listing data changes over time. Actions illustrated in FIG. 4 as below the dotted line, which relate to use of generated models, may be performed at a different frequency (if repeated) than the actions illustrated as above the dotted line. For example, at any point a model has been generated, in an embodiment, listing data for item IDs to be scored may be obtained 410 and one or more generated models are used to calculate 412 listing quality scores for each item identifier associated with the modeling input file. The listing quality score may be a score that is representative of how defective a listing for the item is for some measure of defectiveness. The measure of defectiveness for an item may be based at least in part on calculations of how fixing one or more defects in a listing for the item is estimated to affect one or more statistics related to revenue. The statistics related to revenue may, for instance, be based at least in part on a projected increase in purchases that would be achieved by fixing one or more defects, a projected increase in revenue, profit, and/or the like.

As an example, results of processing a modeling input file may be used to produce a listing quality score according to the following formula:

$$100*[1-\text{Sum(Present Defect coefficients)}/\text{Sum(All Defect Coefficients)}]$$

In this formula, "Sum(Present Defect coefficients)/Sum (All Defect Coefficients)" may represent the number of defects in a listing divided by the number of possible defects for the listing. The number of possible defects for the listing may be a number of defects considered for a model. For example, a listing may have one hundred components, but only twenty are considered in a model. In this instance, the number of possible defects would be twenty since not all components of the listing are considered. In the above formula, "Sum(Present Defect coefficients)/Sum(All Defect Coefficients)" may also be calculated in other ways. For example, in a logistic regression model, "Sum(Present Defect Coefficients)" may represent a sum of regression coefficients in a model calculated for a listing and "Sum(All Defect Coefficients)" may represent a sum that would be calculated if all considered components of the listing were defective. Sums used in calculating scores may be weighted sums to emphasize certain components of listings.

The calculated scores for the listings may be used in various ways. For instance, the calculated scores may be used in processing search queries. Search results responsive to queries may be presentations of listings. The order in which search results are provided may be based at least in part on a calculated listing quality score. For instance, in an ordered set of search results, a search result having a corresponding listing quality score that is low may have a place in the ordering that is less than it would have been had the listing quality score not been used or had the listing quality score been higher. In other words, search result rankings may be based at least in part on calculated listing quality scores. Listing quality scores may also be used to provide information to interested parties to enable the interested parties to prioritize correcting defects in listings. An entity that provides listings, for example, may use information that indicates or otherwise is based at least in part on listing quality scores for listings to decide which listings to address first.

As illustrated in FIG. 4, the process 400 may include, but does not necessarily include, additional actions. Some of these actions may be taken as an alternative to actions described above. For instance, in some embodiments, listing quality scores may not be calculated and used. In an embodiment, once the generated modeling input files have been used to calculate 412 into listing quality scores, an effect, which may be a commercial effect, of defects in a listing for each item identifier is estimated 414 using the results. The effect may be an increase in units purchased when defects present in a listing are fixed, an increase in clicks from search result listings, an increase in revenue, an increase in profit, and the like. In an embodiment, estimating the effect includes first estimating an extra clicks value and using the extra clicks value to estimate an extra purchases value. The extra clicks value may be:

Max(0,Predicted-Actual Click Rate)*Impressions

The extra purchase value may be:

Predicted Purchase Rate*Extra Clicks+Max(0,Predicted-Actual Purchase Rate)*Actual Clicks In the above formulas, "Predicted-Actual Click Rate" is a value that represents an increase in a click rate that a calculated model predicts. The value "Predicted Purchase Rate" may be a value obtained from a model of the results of processing a modeling input file. The value for "Predicted Purchase Rate" may be used to calculate "Max(0,Predicted-Actual Purchase Rate)," where "Actual Purchase Rate" is measured from historical data. "Actual Clicks," similarly, may be obtained from actual data.

Once the effect of fixing the defects has been estimated 414, reporting information is prepared 416. Preparing the reporting information may be performed, for example, by preparing a visual representation of data indicative of the estimated effect for one or more item identifiers. The reporting information may be, for example, a document that indicates that fixing certain specific defects is estimated to result in some commercial advantage, such as an increase in purchases indicates some revenues are generally interchanged in a statistic that is estimated to be affected by correction of the listing defects. The reporting information may order item identifiers according to the corresponding estimated effects and/or calculated scores to indicate which listings should have defects corrected first. In an embodiment, once the reporting information has been prepared 414, the reporting information is provided 416. Reporting information may be provided in various ways, such as by sending an electronic message that includes the reporting information, providing an electronic document that includes the reporting information, displaying the reporting information on a display device, and the like. It should be noted that preparing or providing the reporting information may, as an alternative or in addition, include storing the reporting information into persistent data storage.

Figure 5:
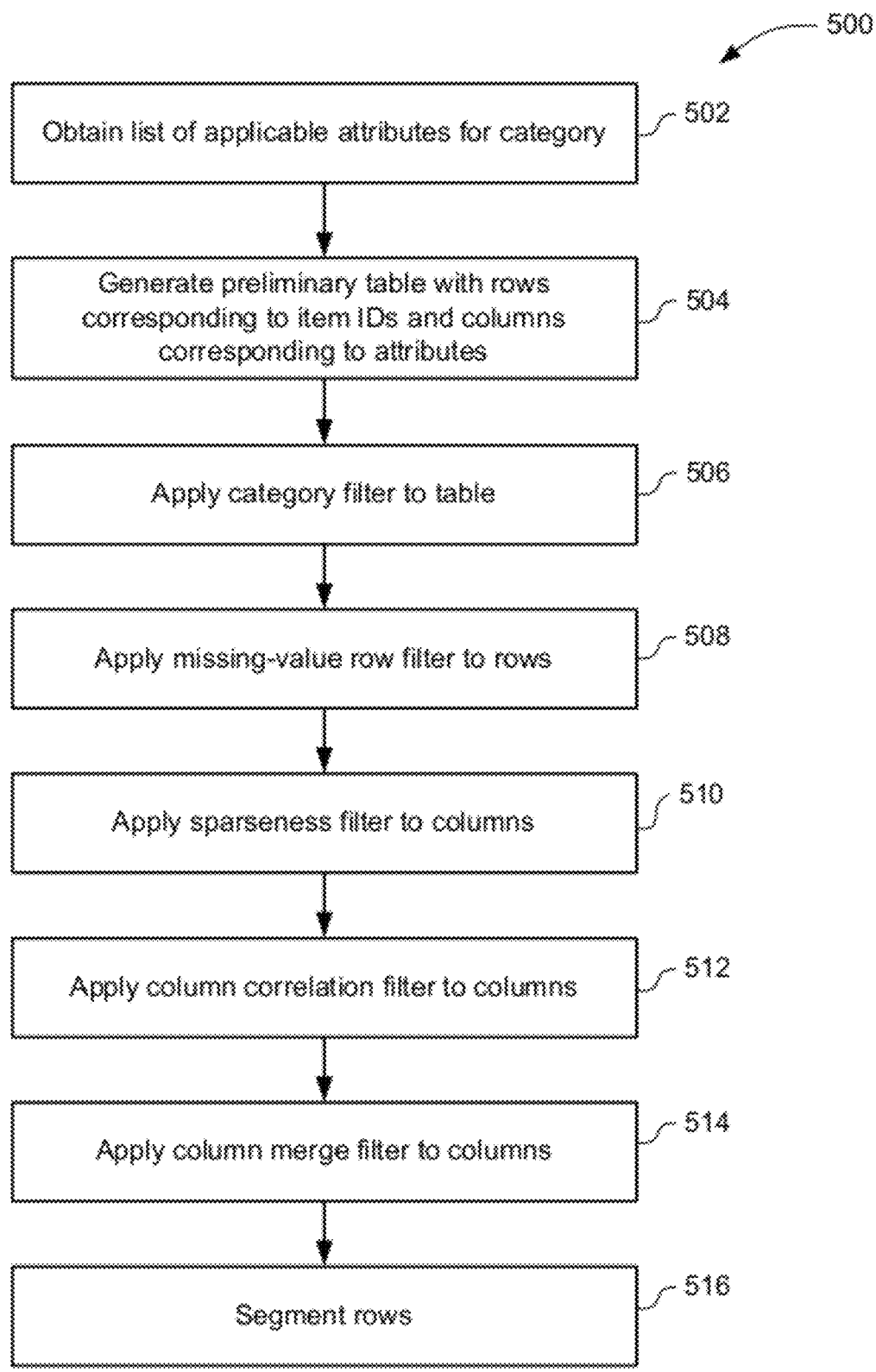
FIG. 5 illustrates example steps of a process for generating a modeling input file in accordance with an embodiment.

FIG. 5 shows an illustrative example of a process 500 for generating a modeling input file. The modeling input file may correspond to items in a particular category. The process 500 illustrated in FIG. 5, or variations thereof, may be used in connection with a process such as the process 400 described above in connection with FIG. 4. In an embodiment, the process 500 includes obtaining 502 a list of applicable attributes for the category. Obtaining the list of applicable attributes may be performed, for example, by obtaining an electronic document, such as a single flat comma-separated value (csv) header file that contains the attributes. The list of applicable attributes may be selected manually or in an automated way. In an embodiment, once the list of applicable attributes for the category is obtained 502, a preliminary table is generated 504. The preliminary table may be a table that includes one row for each product identifier in the category and each column of the table may correspond to an attribute. In this manner, entry in the table corresponds to an attribute associated with a particular item identifier. As an example, an entry in a table may include a 0 or a 1 representative of whether a listing of the corresponding item has information for a corresponding component of the listing.

In an embodiment, once the preliminary table has been generated 504, a category filter is applied to the table 506. A category filter may be a filter that reduces the size of the table based, in some part, on the category. The category filter may, for example, be a category-specific filter that, when applied, causes rows corresponding to items outside of the category to be removed from the table.

In an embodiment, once the category filter has been applied to the table, a listing value row filter is applied 508 to the row filter table. The application of the missing value row filter may include removing rows for which corresponding columns do not have an entry. The reason may be, for example, that the electronic marketplace does not offer the item for consumption, but nevertheless utilizes an identifier for the item as a placeholder. Another reason could be that, for some reason, listing data to populate the columns was not available when other data was obtained. In an embodiment, a sparseness filter is also applied 510 to the columns of the table. Application of the sparseness filter may include removing columns for which less than a threshold amount of rows has a value indicating presence of an attribute. In other words, the application of the sparseness filter may include removing the columns for which merely most or all of the items in the category would technically be considered to have a defect because corresponding listings do not include information for corresponding components. Application of the sparseness filter may include removing columns for which more than a threshold amount of rows have a value indicating presence of an attribute. In an embodiment, generating a modeling input file also includes applying 512 a column correlation filter to the columns. Application of the column correlation filter may include calculating correlation coefficients between columns and identifying one or more sets of columns that are highly correlated and removing from the table one or more of the columns from each set. It should be noted that, while illustrated and described in a particular order, filters may be applied to a table in any suitable order. Further, not all filters need be applied and other filters other than those illustrated and described may be applied as well.

In an embodiment, generating a modeling input file includes applying a column merge filter to the columns of the table. Application of the column merge filter may cause values from columns to be merged. The type of merge may depend on the particular corresponding attributes. For instance, a column for an item description attribute (that indicates whether the listing includes an item description) and a column for an editorial review attribute (that indicates whether the listing includes an editorial review), may be merged using an OR operation. In this manner, the merged column would have entries that indicate whether the listing includes either an item description or an editorial review or both. Other types of merges, such as XOR, or AND merges may also be performed depending on the nature of corresponding attributes.

Once various filters have been applied to the table, the rows of the table may be segmented 516. In an embodiment, the rows are segmented according to how corresponding items are offered for consumption in an electronic marketplace. In particular, in one embodiment, the rows are segmented according to whether or not corresponding items are offered by an operator of the electronic marketplace or a third party. Other rows may be segmented in other ways and, generally, in some embodiments, the rows are not segmented.

Figure 6:
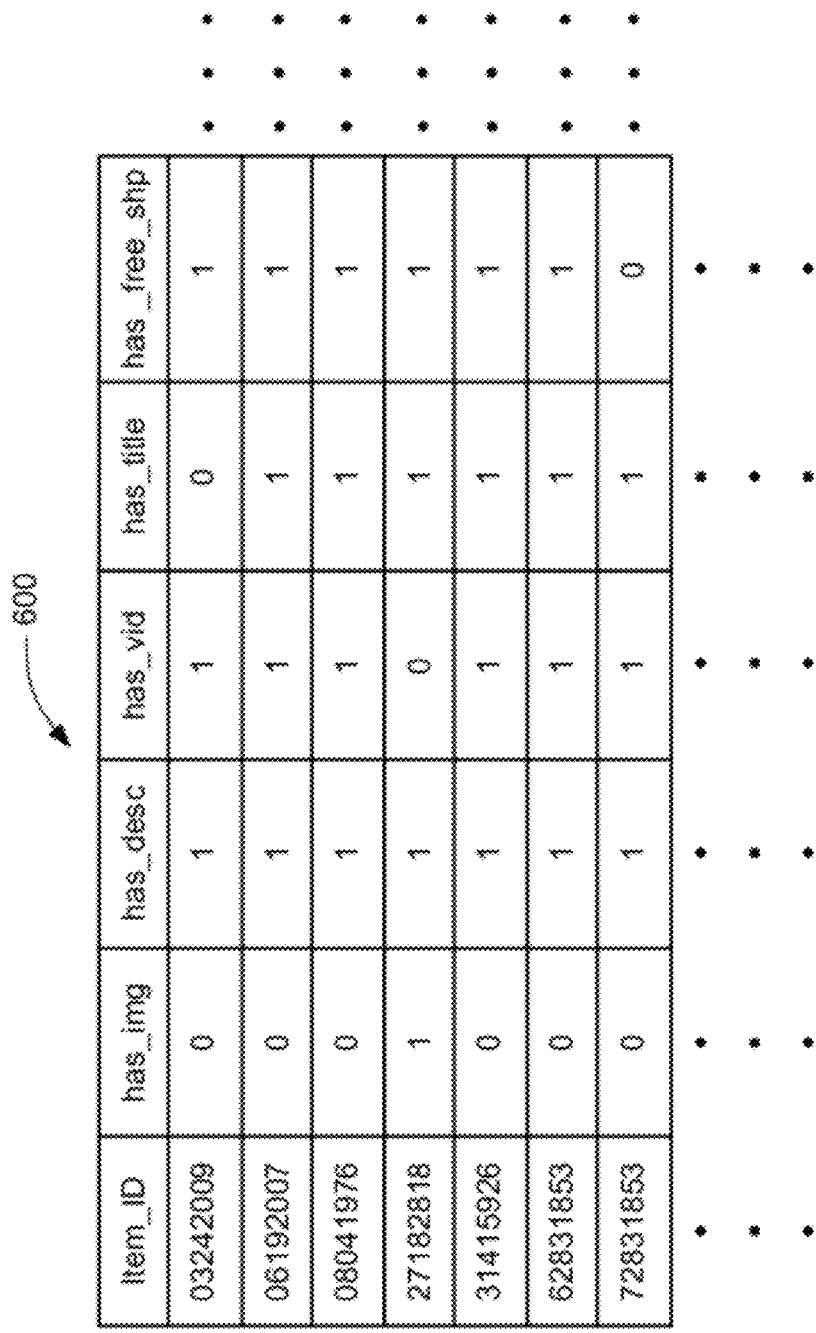
FIG. 6 shows an illustrative example of a representation of a portion of a modeling input file in accordance with an embodiment.

FIG. 6 shows an illustrative example of a representation 600 of a modeling input data file which has been generated in accordance with an embodiment. The modeling input data file illustrated in FIG. 6 may have been produced in accordance with a process, such as the process illustrated above in connection with FIG. 5. The representation 600, in this example, includes a left-most column for an item identifier and other columns corresponding to various attributes. In this example, the headings for each column indicate the attributes that correspond to each column. For example, the left-most column is labeled "Item_ID," thereby indicating that the entries in the column correspond to item identifiers, such as identifiers described above. For this column, the entries may be the item identifiers themselves. As another example, a second column is labeled "has_img," thereby indicating that the entries correspond to whether a listing has an image. In this instance, the entries are 0 or 1, with 1 indicating that a corresponding listing for an item has an image and 0 indicating that a corresponding listing for an item does not have a image. It should be noted that, while the table illustrated in FIG. 6 includes entries that are either item identifiers or 0 or 1, other values may be in the table. For instance, the values may be numerical values that indicate some aspect of a listing, such as how many user reviews a presentation of a listing displays, the price of the corresponding item, and the like. Further, the attributes illustrated in FIG. 6 are illustrative, and different attributes may be used.

Figure 7:
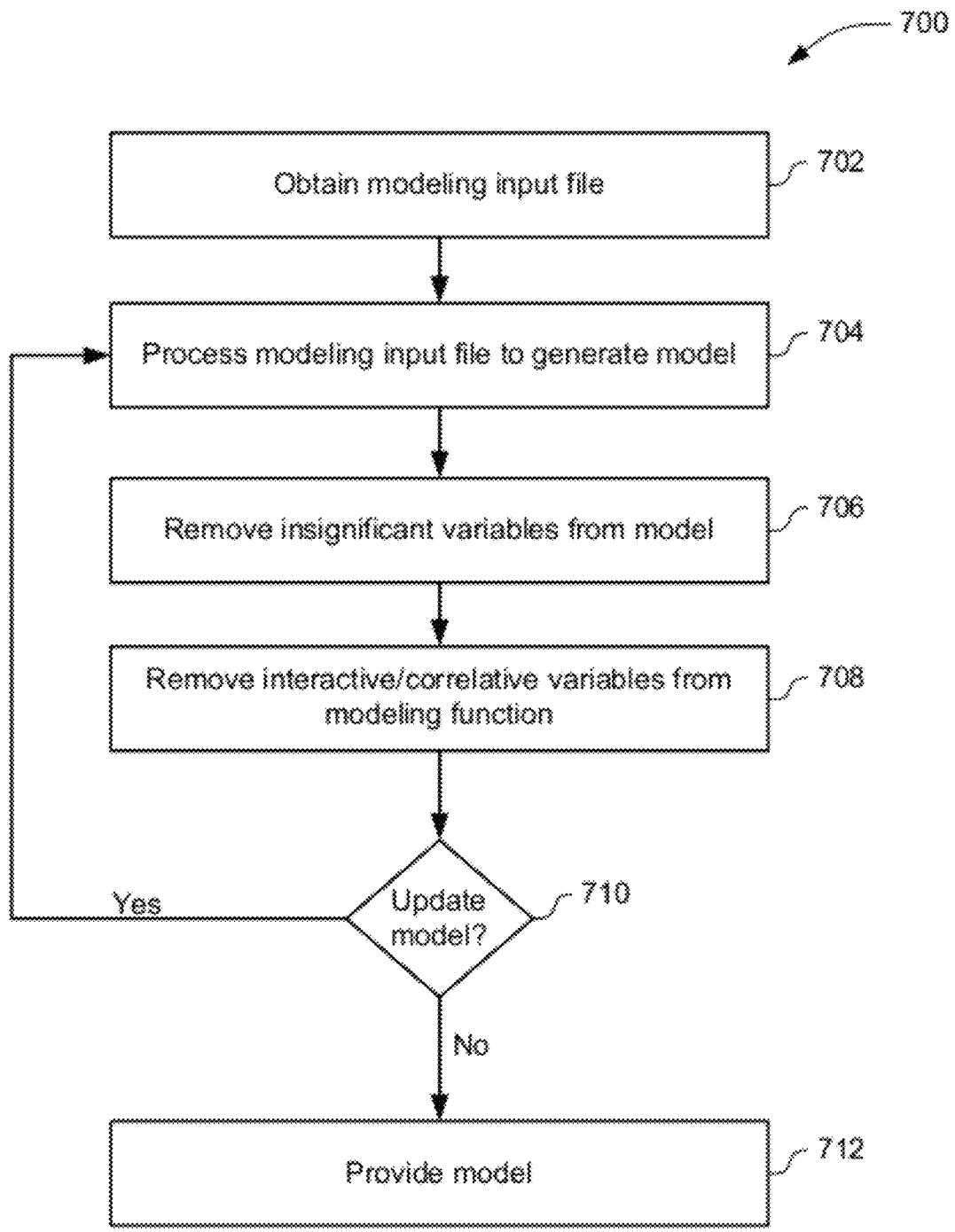
FIG. 7 shows example steps for a process for processing a modeling input file in accordance with an embodiment.

FIG. 7 shows an illustrative example of a process 700 for analyzing a modeling input file in accordance with an embodiment. In an embodiment, the process 700 includes obtaining 702 a modeling input file such as by receiving the modeling input file over a communications network and/or accessing the modeling input file from memory. When the modeling input file is obtained 702, the modeling input file is processed 704 to generate a model. The model of an embodiment may be a mathematical representation of a commercial value, such as described above. The representation may be referred to as a modeling function. The inputs of the modeling function may be information from the modeling input file that indicates the state of various attributes of various listings. Processing the modeling input file may include analyzing data encoded by the modeling input file. The analysis may include the use of regression techniques, such as logistic regression techniques, or other techniques, such as the use of Baysian networks. In an embodiment, the modeling input file is used to provide input to an application that performs such analysis. An example of a suitable application is GNU R on a Linux operating system, although other applications may be used. Generally, any suitable method of analyzing data to obtain one or more mathematical models may be used.

In an embodiment, once the model has been generated, the insignificant variables are removed 706 from the model. In embodiments making use of logistic regression techniques, variables for which coefficients are less than a threshold value are removed in an embodiment. Similarly, variables whose coefficients are negative in some embodiments may indicate that a variable that may be discarded. Generally, any manner of simplifying the model may be used.

In an embodiment, interactive or correlative variables are removed 708 from a modeling function 708. In an embodiment, a determination is made 710 whether or not to update the model. The determination whether to update the model may be based at least in part on whether any variables were removed from a modeling function. If variables were removed, then it may be determined to update the modeling function. The determination may be made based at least in part on whether other factors, such as the coefficients in a current state of the model, the number of times the model has been updated, relatively small changes in variables at the last update, and/or the like.

If a determination is made to update the model, in an embodiment, the modeling input file is once again processed in order to generate an updated model. However, the model generated differs in that the variables that were previously removed are not used in the immediately generated model. Once the new model has been generated 704, insignificant variables may be removed 706 and interactive and/or correlative variables may be removed 708. This process may continue until a determination is made not to update the model and, in an embodiment, the model is provided. Providing the model may include making the model available for estimating the value represented by the model, such as described above. A representation of the model may also be provided. Providing a representation for a model may include, for example, providing an electronic document or causing the appearance on a display device the information representative of the model. The representation of the model may include information that does not directly identify the model itself, but which has been provided using the model, such as reporting information described above.

As discussed, various techniques may be used to analyze data in the creation of models. One technique, in an embodiment, involves the use of logistic regression. An example of a model produced using logistic regression is the following modeling function:

$$\text{Log}(C.R/1-C.R.) = -5.22737655 + \text{missing\_image}^* - 0.96110754 + \text{is\_free\_quick\_ship}^* 0.02694306 + \text{avg\_price}^* 0.07051892 + \text{avg\_rank}^* -0.23308634 + \text{avg\_review\_rating}^* 0.07617192 + \text{missing\_item\_type\_keywords}^* -0.07892411 + \text{Title\_Bad\_Data}^* -0.60274170$$

In this example, "C.R." is a variable representing a click rate, as described above. The attributes of the model, in this example, are evident from the variable names. For instance, "missing_image" is an attribute corresponding to whether a listing has an image. For any particular item in a category for which the model was generated, an actual recorded click rate may be compared with a click rate obtained by substituting ideal values into the modeling function to estimate what the click rate would be if all of the defects of a listing corresponding to the item were corrected. An ideal value may be a value that would indicate that a corresponding defect is not present in a listing. For example, zero may be substituted for "missing_image" to estimate what the click rate would be if the listing did not have a missing_image. Ideal values may be substituted into the modeling function one-by-one (with other values being actual measured values for the item) to determine the effect of fixing each defect, multiple ideal values may be substituted into the modeling function to estimate the effect of correcting corresponding defects, and all ideal values may be substituted to estimate the effect of correcting all defects in a listing.

As noted, the above techniques may be used to generate multiple models that may be used to estimate values used in estimating the effect of correcting listing defects. The following is an example of another model obtained using logistic regression techniques:

$$\text{Log}(P.R./1-P.R.) = -2.20258938 + is\_free\_quick\_ship*0.20748910 + avg\_price*-0.42138600 + avg\_rank*-0.25061915 + avg\_review\_rating*0.07081992 + missing\_brand\_name*-0.28038275 + Brand\_Name\_Bad\_Data*-0.80069989 + Title\_Bad\_Formatting*-0.15678620$$

In this example, "P.R." indicates a purchase rate, which may be a rate indicating a percentage of users who view a representation of a listing that proceeds to purchase an item corresponding to the listing. As with the click rate model above, the variables are named according to the attributes they represent. In this example, the attributes differ from the click rate model. The reason may be that variables found to be significant for one model turned out to be insignificant for another and, therefore, different variables were removed from consideration during the generation of each model. As with the click rate model above, ideal values may be substituted into the modeling function to estimate the value being modeled.

Figure 8:
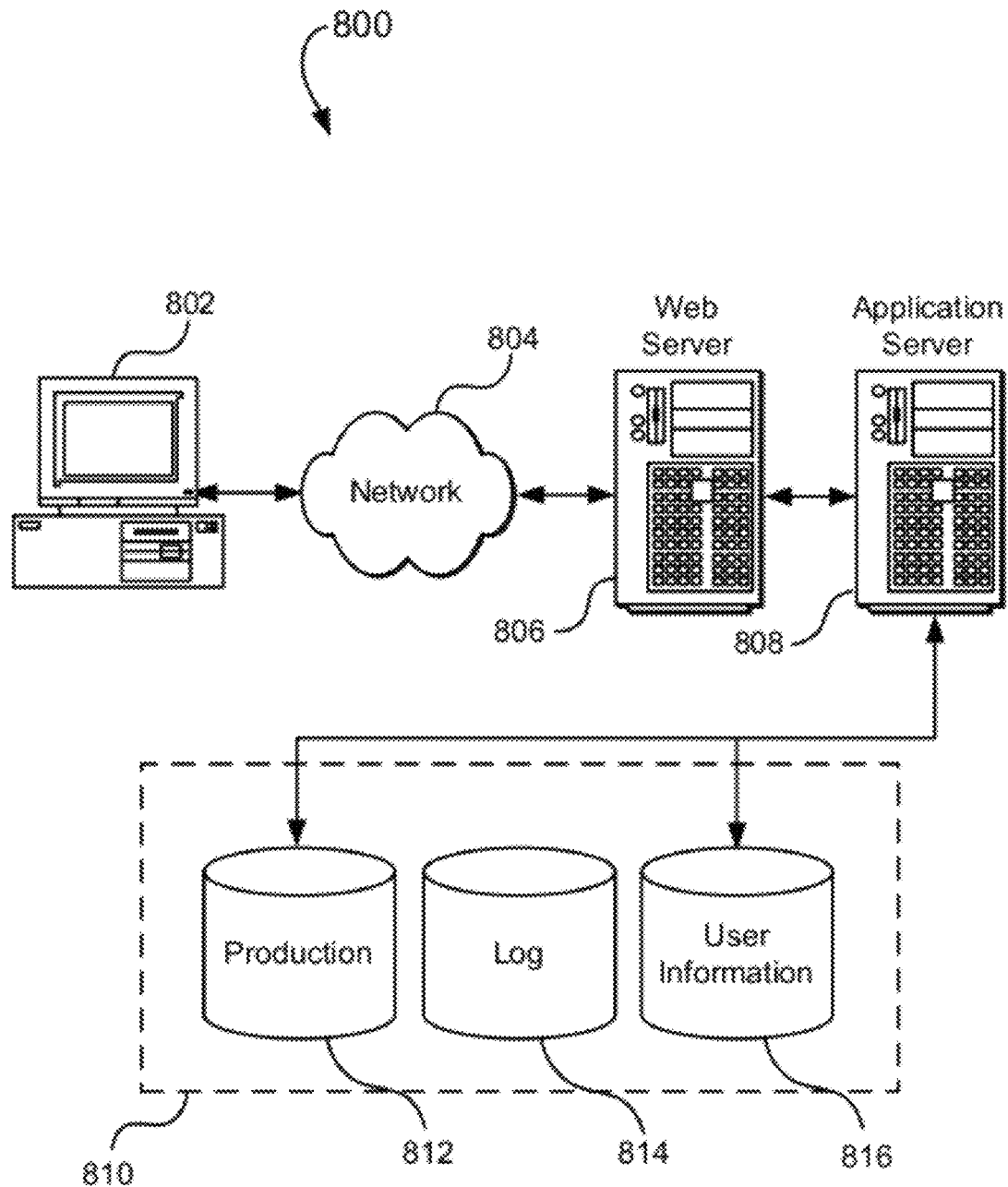
FIG. 8 illustrates an environment in which various embodiments can be implemented.

FIG. 8 illustrates an example of an environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases, or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating information regarding listings for a plurality of items offered for consumption, comprising:
    under the control of one or more computer systems configured with executable instructions,
        obtaining behavioral information associated with the items, the behavioral information indicating one or more measurements of one or more user actions taken in connection with presentations of listings for the items, each listing comprising a collection of information for a corresponding item;
        obtaining listing information for the listings of the items, the listing information including state information corresponding to each of one or more attributes of each listing, at least some of the state information indicating whether the corresponding one or more attributes is in a defective state or a non-defective state;
        generating, based at least in part on the obtained behavioral information and the obtained listing information, one or more models of one or more performance measures of one or more aspects of offering the items for consumption, the one or more models each based at least in part on at least the state information of at least a subset of the one or more attributes of each listing, each model corresponding to a listing;
        determining an impact prediction for each of the listings having at least one defective attribute, the impact prediction based at least in part on the corresponding generated one or more models, the impact prediction indicating at least in part an effect of changing the at least one defective attribute to the non-defective state; and
        providing the impact prediction for each of the listings having at least one defective attribute.

2. The computer-implemented method of claim 1, wherein provided impact predictions are organized based at least in part on a magnitude of each impact prediction.

3. The computer-implemented method of claim 1, wherein at least one of the generated models is a logistic regression model.

4. The computer-implemented method of claim 1, wherein at least one of the one or more performance measures represents a rate at which users who view the listings purchase corresponding items.

5. The computer-implemented method of claim 1, wherein at least one of the models is a function of the state information of at least a subset of the one or more attributes.

6. A computer-implemented method for generating information regarding listings for a plurality of items offered for consumption, comprising:
    under the control of one or more computer systems configured with executable instructions,
        obtaining behavioral information associated with the items, the behavioral information indicating one or more measurements of one or more user actions taken in connection with presentations of listings for the items, each listing comprising a collection of information for a corresponding item;
        obtaining listing information for the listings of the items, the listing information including state information corresponding to each of one or more attributes of each listing, at least some of the state information indicating whether the corresponding one or more attributes is in a defective state or a non-defective state;
        determining an impact prediction for each of the listings having at least one defective attribute, the impact prediction based at least in part on the obtained behavioral information and obtained listing information, the impact prediction indicating at least in part an effect of changing the at least one defective attribute of the one or more listings from a defective state to a non-defective state; and
        providing the impact prediction for each of the listings having at least one defective attribute.

7. The computer-implemented method of claim 6, wherein provided impact predictions are organized based at least in part on a magnitude of each impact prediction.

8. The computer-implemented method of claim 6, wherein the presentations include web pages from an electronic marketplace.

9. The computer-implemented method of claim 6, further comprising:
    generating, based at least in part on the obtained behavioral information and obtained listing information, one or more models of one or more performance measures of one or more aspects of offering the items for consumption, the one or more models each based at least in part on at least the state information of at least a subset of the one or more attributes of each listing, each model corresponding to a listing,
    wherein each impact prediction is further based at least in part on the corresponding generated one or more models.

10. The computer-implemented method of claim 6, wherein the one or more user actions are actions in connection with consumption in an electronic marketplace.

11. A computer-implemented method for generating information regarding listings for a plurality of items offered for consumption, comprising:
    under the control of one or more computer systems configured with executable instructions,
        obtaining behavioral information associated with the items, the behavioral information indicating one or more measurements of one or more user actions taken in connection with presentations of listings for the items, each listing comprising a collection of information for a corresponding item;
        obtaining listing information for the listings of the items, the listing information including a state information corresponding to each of one or more attributes of each listing;
        identifying, based at least in part on the obtained behavioral information and obtained listing information, one or more amendable attributes for one or more corresponding listings, a change to a state of each of the one or more amendable attributes determined to have an effect on at least one performance measure corresponding to the listing;

determining an impact prediction for each of the listings having at least one amendable attribute, the impact prediction indicating at least in part an effect of changing the at least one amendable attribute; and providing the impact prediction for each of the listings having at least one amendable attribute.

12. The computer-implemented method of claim 11, wherein the at least one performance measure represents a rate at which users who view the listing purchase the corresponding item.

13. The computer-implemented method of claim 11, wherein the presentations include web pages.

14. The computer-implemented method of claim 11, wherein the state is changeable from a first state in which information for each of the one or more amendable attributes is missing to a second state in which information for each of the one or more amendable attributes is present.

15. The computer-implemented method of claim 11, further comprising:

generating, based at least in part on the obtained behavioral information and obtained listing information, a logistic regression model of the at least one performance measure for each listing having the at least one amendable attribute, wherein each impact prediction is further based at least in part on the corresponding generated model.

16. A computer system for generating information regarding listings for a plurality of items offered for consumption, comprising:

one or more processors; and memory, including executable instructions that, when executed by the one or more processors, cause the computer system to at least:

obtain behavioral information associated with the items, the behavioral information indicating one or more measurements of one or more user actions taken in connection with presentations of listings for the items, each listing comprising a collection of information for a corresponding item;

obtain listing information for the listings of the items, the listing information including state information corresponding to each of one or more attributes of each listing, at least some of the state information indicating whether the corresponding one or more attributes is in a defective state or a non-defective state;

determine an impact prediction for each of the listings having at least one defective attribute, the impact prediction based at least in part on the obtained behavioral information and obtained listing information, the impact prediction indicating at least in part an effect of changing at least one defective attribute of the one or more listings from a defective state to a non-defective state; and provide the impact prediction for each of the listings having at least one defective attribute.

17. The computer system of claim 16, wherein provided impact predictions are organized based at least in part on a magnitude of each impact prediction.

18. The computer system of claim 16, wherein the presentations include web pages from an electronic marketplace.

19. The computer system of claim 16, wherein the memory further includes executable instructions that cause the computer system to:

generate, based at least in part on the obtained behavioral information and obtained listing information, one or more models of one or more performance measures of one or more aspects of offering the items for consumption, the one or more models each based at least in part on at least the state information of at least a subset of the one or more attributes of each listing, each model corresponding to each listing, wherein each impact prediction is further based at least in part on the corresponding generated one or more models.

20. The computer system of claim 19, wherein the one or more models are logistic regression models.

21. One or more non-transitory computer-readable storage media having collectively stored thereon instructions that are executable by one or more processors of a computer system to cause the computer system to at least:

obtain behavioral information associated with the items, the behavioral information indicating one or more measurements of one or more user actions taken in connection with presentations of listings for the items, each listing comprising a collection of information for a corresponding item;

obtain listing information for the listings of the items, the listing information including state information corresponding to each of one or more attributes of each listing;

identify, based at least in part on the obtained behavioral information and obtained listing information, one or more amendable attributes for one or more corresponding listings, a change to a state of each of the one or more amendable attributes determined to have an effect on at least one performance measure corresponding to the listing;

determine an impact prediction for each of the listings having at least one amendable attribute, the impact prediction indicating at least in part an effect of changing the at least one amendable attribute; and provide the impact prediction for each of the listings having at least one amendable attribute.

22. The one or more non-transitory computer-readable storage media of claim 21, wherein the at least one performance measure represents a rate at which users who view the listing purchase the corresponding item.

23. The one or more non-transitory computer-readable storage media of claim 21, wherein the presentations include web pages.

24. The one or more non-transitory computer-readable storage media of claim 21, wherein the state is changeable from a first state in which information for each of the one or more amendable attributes is missing to a second state in which information for each of the one or more amendable attributes is present.

25. The one or more non-transitory computer-readable storage media of claim 21, further storing executable instructions to cause the computer system to:

generate, based at least in part on the obtained behavioral information and obtained listing information, a regression model of the at least one performance measure for each listing having the at least one amendable attribute, wherein each impact prediction is further based at least in part on the corresponding generated model.

26. A computer-implemented method for generating information regarding listings for a plurality of items offered for consumption, comprising:
under the control of one or more computer systems configured with executable instructions,
obtaining behavioral information associated with the items, the behavioral information indicating one or more measurements of one or more user actions taken by users in connection with presentations of listings for the items, each listing comprising a collection of information for a corresponding item;
obtaining listing information for the listings of the items, the listing information including state information corresponding to each of one or more attributes of each listing, at least some of the state information indicating whether the corresponding one or more attributes is in a defective state or a non-defective state;
calculating, based at least in part on the obtained behavioral information and obtained listing information, one or more quality scores for each of one or more of the listings; and
providing information that is based at least in part on the calculated one or more quality scores.

27. The computer-implemented method of claim 26, wherein calculating the one or more quality scores includes identifying an attribute for which changing from a first state to a second state is expected to, based at least in part on the obtained behavioral information and obtained listing information, have an effect on at least one performance measure corresponding to each of the one or more listings; and
wherein a calculated score for a corresponding listing is based at least in part on a state of the identified attribute for the corresponding listing.

28. The computer-implemented method of claim 26, further comprising:
generating, based at least in part on the obtained behavioral information and obtained listing information, one or more models of one or more performance measures of one or more aspects of offering the items for consumption, the one or more models each based at least in part on at least the state information of at least a subset of the one or more attributes of each listing, each model corresponding to a listing,
wherein the calculated one or more quality scores is further based at least in part on the corresponding generated one or more models.

29. The computer-implemented method of claim 26, wherein providing the information includes ranking a set of search results based at least in part on the calculated one or more quality scores and providing at least a portion of the ranked set of search results.

30. The computer-implemented method of claim 26, wherein providing the information includes providing a ranking of the one or more listings corresponding to the calculated one or more quality scores.

* * * * *